E. A. Anderson, Brooms.

No. 117959 — Patented Aug 15 1871

Witnesses:
C. Raettig.
Wm. H. C. Smith.

Inventor:
E. A. Anderson.
pr.
Attorneys.

UNITED STATES PATENT OFFICE.

EDWARD AMERICUS ANDERSON, OF DANVILLE, TEXAS.

IMPROVEMENT IN BROOMS.

Specification forming part of Letters Patent No. 117,959, dated August 15, 1871.

*To all whom it may concern:*

Be it known that I, EDWARD AMERICUS ANDERSON, of Danville, in the county of Montgomery and State of Texas, have invented a new and useful Improvement in Brooms; and I do hereby declare that the following is a full, clear, and exact description thereof, which will enable others skilled in the art to make and use the same, reference being had to the accompanying drawing forming part of this specification.

This invention relates to improvements in the manufacture of corn-brooms; and it consists in securing the corn-brush to the handle by the employment of a conical or flat tapered thin sheet-metal ferrule and a correspondingly-shaped end of the handle, but smaller, the brush being packed in the ferrule as much as the required amount and then separated by a tapered mandrel, and spreading it to the shape of the said ferrule being driven in from the tops of the brush, the butt-ends being packed in the ferrules to make room for the handle, which is then driven in after the mandrel is removed and secured by nails or screws.

Figure 1:
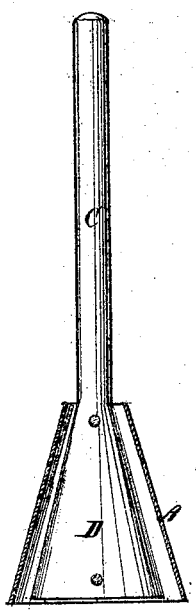
Figure 2:
Figure 3:
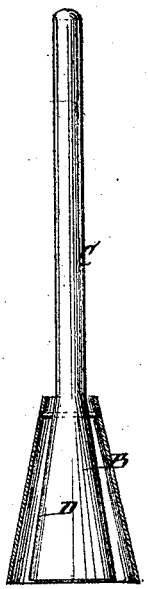

Figure 1 is a sectional elevation of a flattened or oval-tapered socket. Fig. 2 is a section through the same taken in the plane perpendicular to that of Fig. 1, and Fig. 3 is a section of a conical ferrule.

Similar letters of reference indicate corresponding parts.

I make sheet-metal ferrules A B of flat, oval, or conical, or other suitable form, much larger at one end than at the other, and as long as may be required to secure the corn-brush firmly, and I provide the handles C with tapered, oval, or conical enlargements D at the lower ends corresponding with the ferrules for wedging the brush firmly between them and the ferrules, the said handles being driven in from the bottom at the center of the brush after the ferrules have been filled with the latter.

Having thus described my invention, I claim as new and desire to secure by Letters Patent—

The combination of the conical or oval-tapered sheet-metal ferrules A B and the correspondingly-shaped handles C D in a broom, substantially as specified.

EDWARD AMERICUS ANDERSON.

Witnesses:
JAMES J. BRICE,
J. S. HULON.